United States Patent [19]
Itoh et al.

[11] Patent Number: 5,934,094
[45] Date of Patent: Aug. 10, 1999

[54] VEHICLE AIR CONDITIONING SYSTEM WITH EXPANSION VALVE CONTROL DURING HIGH PRESSURE CYCLE CONDITIONS

[75] Inventors: Satoshi Itoh, Kariya; Yuji Takeo, Toyoake; Eiji Takahashi, Toyohashi; Kunio Iritani, Anjo, all of Japan

[73] Assignee: Denso Corporation, Kariya, Japan

[21] Appl. No.: 09/189,759

[22] Filed: Nov. 10, 1998

[30] Foreign Application Priority Data

Nov. 27, 1997 [JP] Japan ................................. 9-326632

[51] Int. Cl.⁶ ........................................ F25B 13/00
[52] U.S. Cl. ..................... 62/222; 62/DIG. 17; 62/205; 62/206; 62/160; 62/509
[58] Field of Search ............................. 62/222, DIG. 17, 62/205, 206, 160, 210, 509, 228.3

[56] References Cited

U.S. PATENT DOCUMENTS 5,704,219  1/1998  Suzuki et al. ............................. 62/222
5,778,691  7/1998  Suzuki et al. ............................. 62/160

FOREIGN PATENT DOCUMENTS

A-9-86149  3/1997  Japan.

*Primary Examiner*—Henry Bennett
*Assistant Examiner*—Marc Norman
*Attorney, Agent, or Firm*—Harness, Dickey & Pierce, PLC

[57] ABSTRACT

A control apparatus for a gas injection type air conditioning system that prevents lowering of compressor speed and cycle stoppage under conditions where high pressure is liable to occur. During a system heating mode, a pressure change rate ASP of the high pressure of the refrigerating cycle is calculated. When a pressure change rate ΔSP rises above a predetermined value, a system electric expansion valve aperture is reduced. Accordingly, by calculation of the pressure change rate ΔSP, it is possible to control the electric expansion valve in the above manner earlier than in prior art control schemes when there is a sudden rise in the high pressure.

15 Claims, 12 Drawing Sheets

FIG. 17
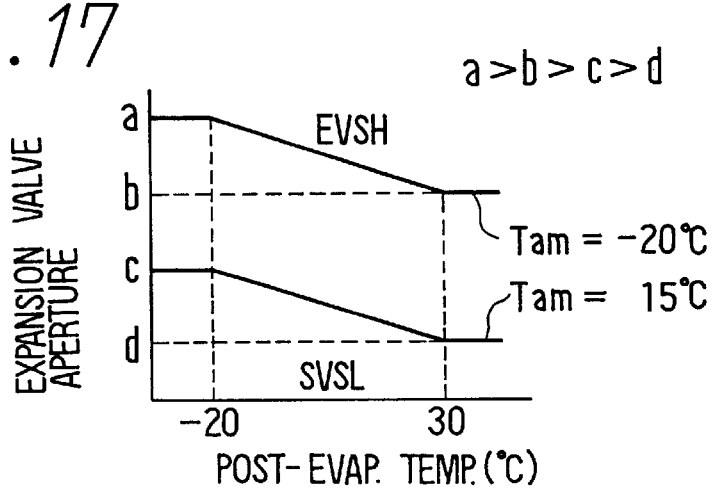
$[Tam \leq -20°C] \rightarrow EVS' = EVSH$
$[Tam > 15°C] \rightarrow EVS' = EVSL$
$[-20°C < Tam \leq 15°C]$
$\rightarrow EVS' = EVSH * (-Tam)/35$
$\quad + EVSL * (Tam+35)/35$
FIG. 18
| AIRFLOW LEVEL | Kevs |
|---|---|
| Hi | 1 |
| M2 | 0.95 |
| M1 | 0.9 |
| LO | 0.85 |
FIG. 19
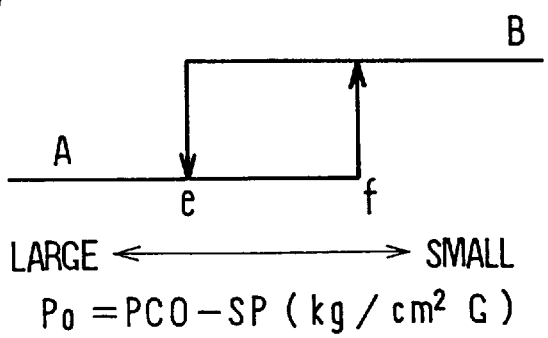
LARGE ⟵⟶ SMALL
$Po = PCO - SP \ (kg/cm^2 \ G)$

VEHICLE AIR CONDITIONING SYSTEM WITH EXPANSION VALVE CONTROL DURING HIGH PRESSURE CYCLE CONDITIONS

CROSS-REFERENCE TO RELATED APPLICATION

The present application is related to and claims priority from Japanese Patent Application No. Hei. 9-326632, the contents of which are incorporated herein by reference.

BACKGROUND OF THE PRESENT INVENTION

1. Technical Field

The invention relates to air conditioner compressor control systems, and particularly to a vehicle air conditioner system control method and apparatus that prevents a system compressor from decreasing in speed, or altogether stopping, due to high pressure cycle conditions, with the system having particular application in an electric vehicle heat pump system.

2. Related Art

In Japanese Unexamined Patent Publication No. Hei. 9-86149, a vehicle heat pump system having a gas injection cycle for increasing heating capacity in an air-conditioning apparatus for an electric car has been proposed.

In such a system, the amount of gas injected to an electric compressor is increased to increase heating capacity at times of low outside air temperature. The amount of injected gas is increased by opening the aperture pressure-reduces high-pressure refrigerant to an intermediate pressure at times of heating capacity deficiency, to increase the intermediate pressure. As a result, the compression work of the electric compressor is increased, and the amount of heat released by refrigerant in an inside heat exchanger is increased.

And, when a detection value of a current sensor for an inverter for electric compressor speed control rises to a predetermined value, the aperture of the high-pressure side electric expansion valve is reduced to prevent overloading of the inverter.

However, in the above-described expansion valve control, if the use limit of the inverter is exceeded, an inverter protection control function works, and the compressor speed is lowered, or compressor (cycle) stoppage occurs. This often occurs during heating when the high pressure of the cycle is liable to rise, such as when the airflow into the compartment is low or the temperature in the compartment is high, because compressor torque rises as a result of a sudden rise in the high pressure. This result may occur even if the aperture of the high-pressure side electric expansion valve is reduced from when the current value of the inverter is detected to have risen above a predetermined value.

In more detail, the vertical axis of FIG. 23A is output current (inverter line current) of an inverter for electric compressor speed control and cycle high pressure. At times of heating, under conditions such as when the airflow delivered into the compartment is low and when the temperature in the compartment is high, or at times of switching from an outside air intake mode to an inside air intake mode, because the compressor torque rises due to a sudden rise in high pressure, the increase in the inverter current is great.

Consequently, even if the high-pressure side electric expansion valve starts to close when the inverter current is detected to have exceeded a first determination current value g at time $t_1$ shown in FIG. 23, because the behavior of the cycle cannot immediately follow the reduction in the expansion valve aperture, the rise of the high pressure cannot be immediately suppressed. Over a short time period from time $t_1$ to time $t_2$, the high pressure continues to rise.

Consequently, the inverter current also continues to rise over the period from time $t_1$ to time $t_2$, and often it may exceed second, third determination current values h, i of the region of inverter protection control.

Here, when the inverter current exceeds the second determination current value h, control that lowers the compressor speed is carried out. When the inverter current exceeds the third determination current value i, the compressor is stopped.

As a result of the lowering of the compressor speed, or of compressor (cycle) stoppage occurring, heating draft air temperature decreases, thereby reducing passenger compartment heating effectiveness.

SUMMARY OF THE INVENTION

It is therefore an object of the present invention, in view of the points mentioned above, to prevent lowering of the compressor speed and cycle stoppage even under conditions such that the cycle high pressure is liable to rise.

To achieve the above-mentioned object, the present invention provides a control method/apparatus for a gas injection type air conditioning system including a compressor having a gas injection port, an inside heat exchanger having a condensing action during heating, a first pressure reducer whose aperture is electronically adjustable, a gas-liquid separator, a second pressure reducer, and an outside heat exchanger having an evaporating action during heating.

During heating, a pressure change rate (SP) is calculated based on information relating to the high pressure of the refrigerating cycle. When the pressure change rate (SP) rises above a first predetermined value (k), the aperture of the first pressure-reducer is controlled to the valve-closing side.

By calculating the pressure change rate (SP), it is possible to initiate aperture control of the first pressure reducer to the reduction side before the above-discussed control apparatuses initiate control when there is a sudden rise in pressure. Consequently, the pressure can be prevented from rising to a level likely to result in lowering of the compressor speed or cycle stoppage to thereby prevent a decrease in the efficiency of passenger compartment heating.

BRIEF DESCRIPTION OF THE DRAWINGS

FIG. 17 is a map showing a relationship between expansion valve aperture and post-evaporator temperature in the present invention;

FIG. 18 is a table showing a relationship between a correction coefficient Kevs for expansion valve aperture control and airflow level in the present invention;

FIG. 19 is an explanatory view of heating capacity deficiency determination in the present invention;

DETAILED DESCRIPTION OF THE PRESENT INVENTION

Figure 1:
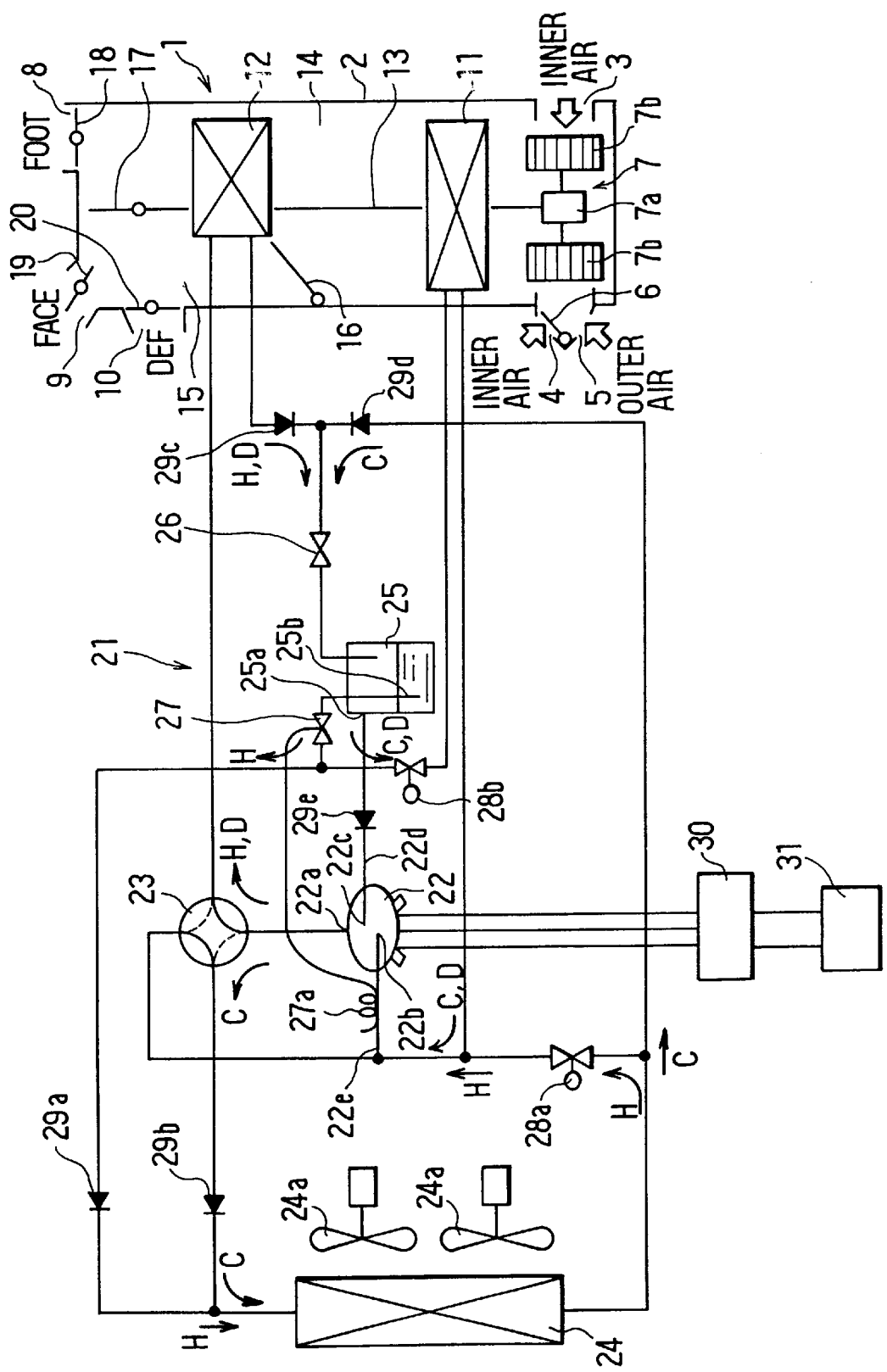
FIG. 1 is an overall construction view of a vehicle air conditioning system including the control apparatus according to an embodiment of the present invention.

The invention will now be described with reference to the embodiment shown in the drawings.

FIG. 1 shows the overall construction of an embodiment in which the invention is applied to an air-conditioning apparatus for an electric car. It should be noted that the overall constitution of the FIG. 1 is the same as in the above-mentioned Japanese Unexamined Patent Publication No. Hei. 9-86149.

An air-conditioning unit 1 is disposed inside the passenger compartment of an electric car, and an air-conditioning duct 2 thereof forms an air passage guiding conditioned air into the passenger compartment. Intake openings 3, 4 and 5 for inside and outside air are provided at one end of the air-conditioning duct 2. An inside air intake opening 4 and an outside air intake opening 5 are selectively opened and closed by an inside-outside switching door 6. The inside-outside switching door 6 is driven by a servo motor (not shown).

Also, inside the air-conditioning duct 2, adjacent to the above-mentioned intake openings 3 through 5, a blower 7 for producing an air flow inside the air-conditioning duct 2 is disposed. The blower 7 includes a fan motor 7a and centrifugal fans 7b, 7b driven by the fan motor 7a.

Located at the other end of the air-conditioning duct 2 are a foot outlet 8 for blowing conditioned air toward the feet of a passenger inside the passenger compartment, a face outlet 9 for blowing air-conditioning air toward the upper body of a passenger inside the passenger compartment, and a defroster outlet 10 for blowing air-conditioning air toward the inner side of a front windshield of the vehicle.

Also, an inside heat exchanger 11 for cooling is disposed on the air downstream side of the blower 7 inside the air-conditioning duct 2. The heat exchanger 11 is part of a refrigerating cycle 21, and functions as an evaporator for dehumidifying or cooling the air inside the air-conditioning duct 2 when refrigerant flows therethrough. In a heating operation mode, refrigerant does not flow inside the heat exchanger 11.

On the air downstream side of the inside heat exchanger inside the air-conditioning duct 2, an inside heat exchanger for heating 12 is disposed. The inside heat exchanger 12 is part of the refrigerating cycle 21. In the heating operation mode and the dehumidifying operation mode, by means of a heat-releasing action of refrigerant flowing inside it, the heat exchanger 12 functions as a condenser for heating the air inside the air-conditioning duct 2. In the cooling operation mode, refrigerant does not flow inside the inside heat exchanger 12.

The air flow passage inside the air-conditioning duct 2 is partitioned by a partitioning wall 13 into a first air flow passage 14 on the foot outlet side and a second air flow passage 15 on the face outlet and defroster outlet side. The inside of the air-conditioning duct 2 is divided into the first and second air flow passages 14, 15 to lighten the heating load experienced in winter. High-temperature air is taken into the first air flow passage 14 through the inside air intake opening 3 and is blown at the passenger's feet. Also, low-humidity outside air is taken into the second air flow passage 15 through the outside air intake opening 5 to simultaneously prevent windshield fogging.

A door 16 is operative to open and close the second air flow passage 15. A door 17 is operative to open and close the partition between the first and second air flow passages 14, 15. Doors 18 through 20 open and close air flow passages of the outlets 8, 9 and 10. The doors 16 through 20 are driven by servo motors (not shown).

The above-mentioned refrigerating cycle 21 is a heat pump type refrigerating cycle for cooling and heating the inside of the passenger compartment by means of the inside heat exchangers 11, 12, and also includes the following devices.

That is, a compressor 22 for intaking, compressing and delivering refrigerant, an electromagnetic four-way valve 23 for switching refrigerant flow, an outside heat exchanger 24, a gas-liquid separator 25 for gas-liquid separating refrigerant and collecting liquid refrigerant, an electric expansion valve 26 for pressure-reducing high pressure side refrigerant of the refrigerating cycle 21 to an intermediate pressure (for example about 4 to 15 kg/cm$^2$), a temperature-operated expansion valve 27 for pressure-reducing liquid refrigerant from the gas-liquid separator 25 to a low pressure, electromagnetic valves 28a, 28b and non-return valves 29a through 29e are also included in the refrigerating cycle 21.

Figure 2:
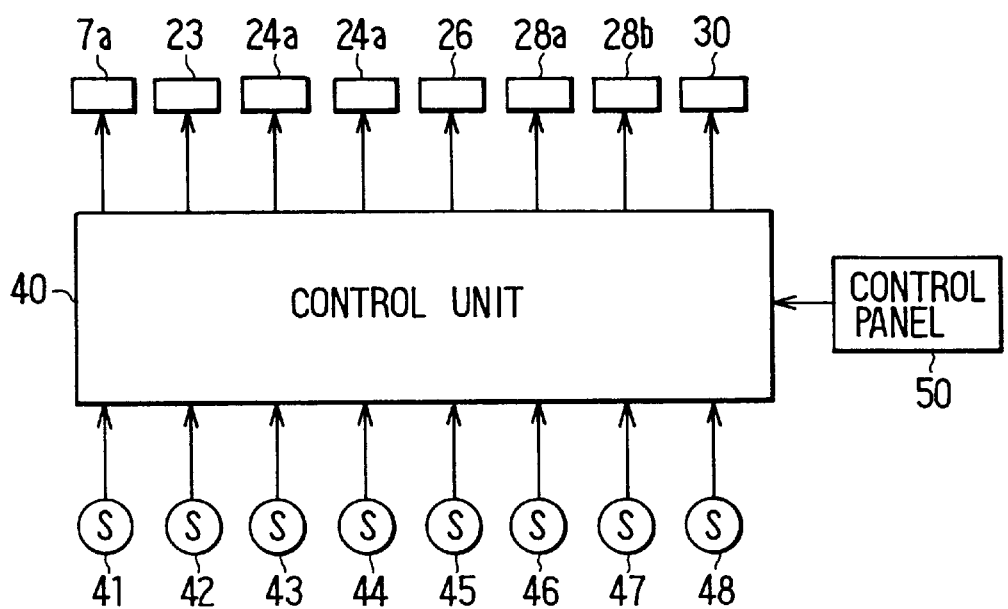
FIG. 2 is a block diagram of a control apparatus of the present invention.

The compressor 22 is an electric compressor and is driven by an electric motor (not shown). The compressor intakes, compresses and delivers refrigerant. The electric motor is disposed integrally with the compressor 22 inside a sealed case, and its speed is continuously variable by via control of an inverter 30. The inverter 30 is connected to a car-mounted battery 31 and has a current flowing through it that is controlled by a control unit 40 (FIG. 2).

The compressor 22 has a delivery port 22a for delivering compressed refrigerant, an intake port 22b for intaking refrigerant from the low-pressure side of the cycle, and a gas injection port 22c through which intermediate pressure gas refrigerant separated by the gas-liquid separator 25 is injected. The gas injection port 22c is connected by way of a gas injection passage 22d having a non-return valve 29e to a gas refrigerant outlet 25a at the top of the gas-liquid separator 25.

A temperature sensing tube 27a of the temperature-operated expansion valve 27 is set on a refrigerant intake passage 22e connected to the above-mentioned intake port 22b. The aperture (degree of throttling) of the temperature-operated expansion valve 27 is adjusted so that the degree of superheating of the refrigerant in the refrigerant intake passage 22e assumes a predetermined value.

The above-mentioned outside heat exchanger 24 is disposed outside the passenger compartment, and, when electric outside fans 24a are driven by the control unit 40 (FIG. 2), exchanges heat with outside air blown through it from the electric outside fans 24a.

The aperture (degree of throttling) of the above-mentioned electric expansion valve 26 is adjusted by a control unit-controlled current flowing through the valve (FIG. 2).

Detection values are input to the above-mentioned control unit 40, as shown in FIG. 2, from: an outside air temperature sensor 41 detecting the outside air temperature; an intake temperature sensor 42 detecting an intake side air temperature of the inside heat exchanger for cooling 11; a post-evaporator temperature sensor 43 detecting the temperature of air immediately after it passes through the inside heat exchanger for cooling 11; an inside heat exchanger outlet refrigerant temperature sensor 44 detecting the temperature of refrigerant immediately after it exits the inside heat exchanger for heating 12; and an outside heat exchanger outlet refrigerant temperature sensor 45 detecting the temperature of refrigerant immediately after it exits the outside heat exchanger 24.

Also, detection values are input to the control unit 40 from a delivery refrigerant temperature sensor 46 detecting the temperature of refrigerant delivered from the compressor 22, a high-pressure sensor 47 detecting the inlet refrigerant pressure of the electric expansion valve 26, and a current sensor 48 detecting a line current of the inverter 30 are input, as well as signals from levers and switches of a control panel 50 mounted in the front of the passenger compartment.

Figure 3:
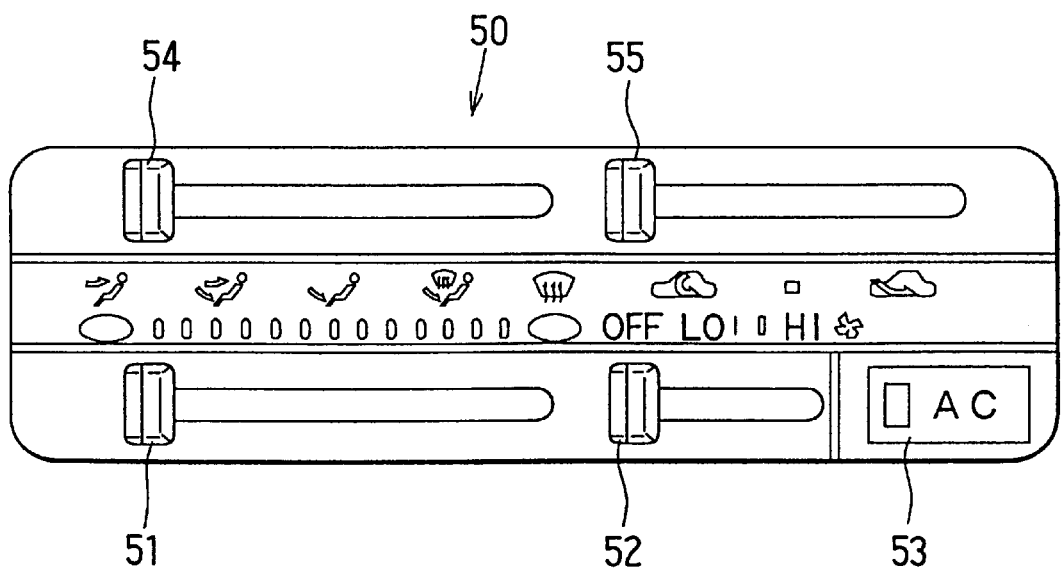
FIG. 3 is a front view of a control panel 50 of the air conditioning system of FIG. 1.

On the control panel 50, as shown in FIG. 3, members 51 through 55, operated by hand by a passenger, are provided. Here, 51 is a temperature setting lever for setting a target value of the temperature of air blown into the passenger compartment, 52 is an airflow switching lever for switching airflow delivered by the blower 7, 53 is an air-conditioning switch for cutting or continuing the operation of the compressor 22, 54 is a blowing mode switching lever for switching the setting of a blowing mode, and 55 is an inside/outside air switching lever for switching an inside/outside air switch mode.

Figure 4:
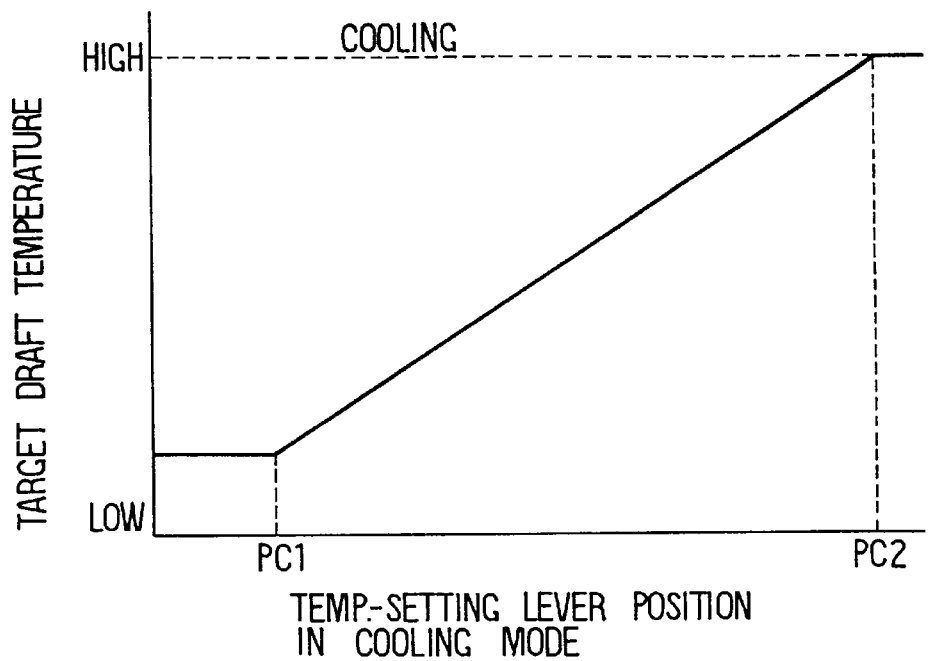
FIG. 4 is a map showing a relationship of target draft temperature with respect to set position of a temperature setting lever in a cooling mode.
Figure 5:
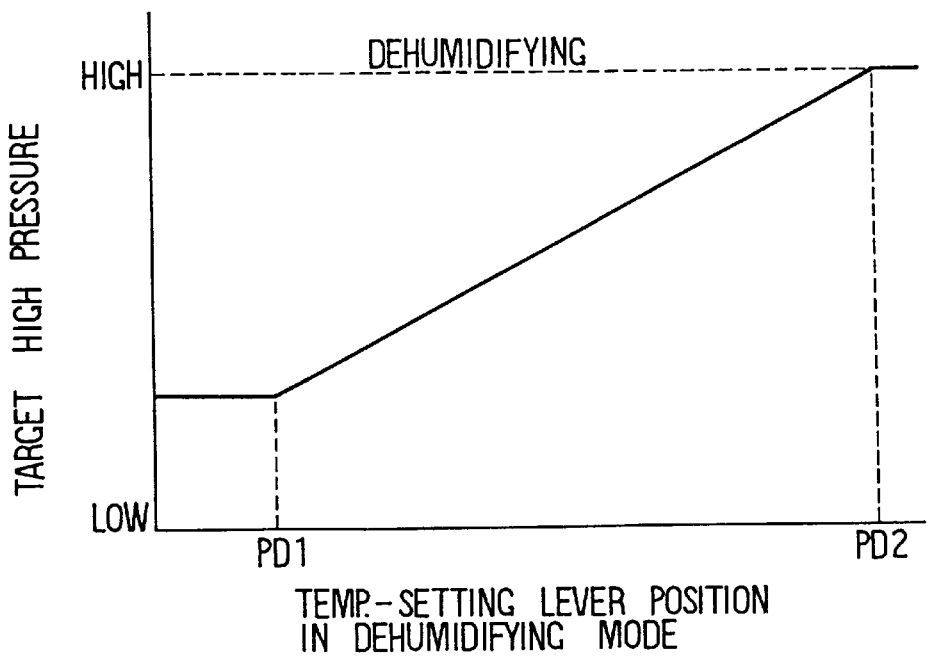
FIG. 5 is a map showing a relationship of target high-pressure pressure with respect to set position of the temperature setting lever in a dehumidifying mode.
Figure 6:
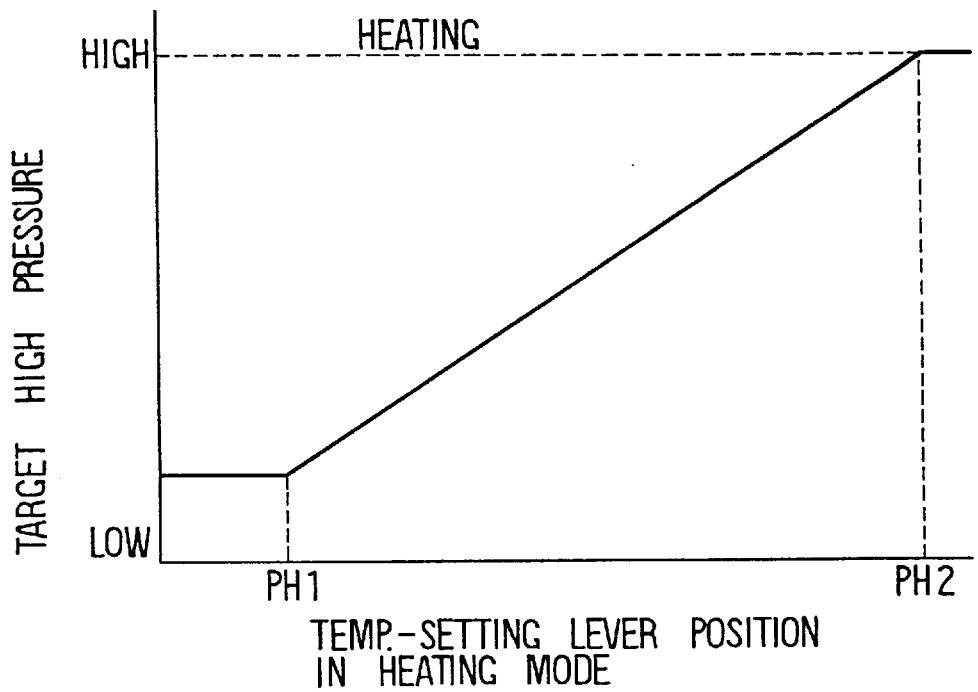
FIG. 6 is a map showing a relationship of target high pressure with respect to a set position of the temperature setting lever in a heating operation mode.

The temperature setting lever 51 is a lever for setting a target value of the temperature of air blown into the passenger compartment. The control unit 40, according to the set position of the temperature setting lever 51, in the cooling operation mode, decides a target value of the air cooling degree in the inside heat exchanger 11 (specifically, the air temperature immediately after it passes through the inside heat exchanger for cooling 11) as shown in FIG. 4. In the dehumidifying operation mode and the heating operation mode, the control unit 40 decides a target value of an air heating degree in the inside heat exchanger 12 (specifically, the delivery refrigerant pressure of the compressor 22), as shown in FIGS. 5, 6.

Figure 7:
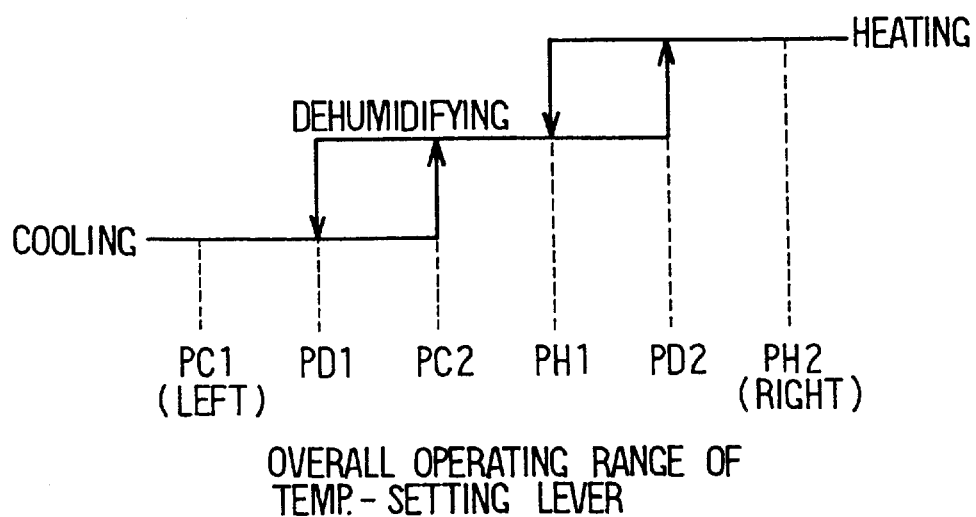
FIG. 7 is a view showing a relationship of refrigerating cycle operation modes with respect to the overall operating range of the temperature setting lever.

The temperature setting lever 51 also functions as a lever for deciding the operating mode of the refrigerating cycle 21. Correspondingly, the control unit 40, as shown in FIG. 7, switches the operating mode of the refrigerating cycle 21. That is, the control unit 40 controls the electromagnetic four-way valve 23 and the electromagnetic valves 28a, 28b, so that the operating mode of the refrigerating cycle 21 accordingly becomes the cooling operation mode, the dehumidifying operation mode, or the heating operation mode, respectively, as the temperature setting lever 51 is moved from the left in FIG. 3 to the right.

Inside the above-mentioned control unit 40, a known microcomputer including a CPU, ROM, RAM and so on (not shown) is provided, and signals from the above-mentioned sensors 41 through 48 and the control panel 50 are input into the microcomputer via an input circuit (not shown) inside the control unit 40.

The microcomputer executes predetermined processing, and, based on the results thereof, controls the fan motor 7a, the electromagnetic four-way valve 23, the electric outside fans 24a, 24a, the electric expansion valve 26, the electromagnetic valves 28a, 28b and the inverter 30. The control unit 40, when a key switch of the electric car (not shown) is turned on, is supplied with power from the above-mentioned battery 31.

Next, operation of the above-described embodiment will be described. When the air-conditioning switch 53 is turned on, a signal thereof is input into the control unit 40, and the compressor 22 is started. Then, when the cooling operation mode is set with the temperature control lever 51, refrigerant flows along the route shown by the arrows C in FIG. 1.

That is, high-temperature high-pressure refrigerant delivered by the compressor 22 passes through the four-way valve 23 and the non-return valve 29b, and flows into the outside heat exchanger 24. The refrigerant at this point exchanges heat with outside air blown by the outside fans 24a so that the gas refrigerant condenses. Next, refrigerant, having flowed out from the outside heat exchanger 24 because the electromagnetic valve 28a is closed, passes through the non-return valve 29d, is reduced in pressure by the electric expansion valve 26, and assumes an intermediate pressure gas/liquid two-phase state.

The intermediate pressure gas/liquid two-phase refrigerant flows into the gas-liquid separator 25, and is separated into saturated gas refrigerant and saturated liquid refrigerant. The gas refrigerant passes through the gas refrigerant outlet 25a at the top of the gas-liquid separator 25. After subsequently passing through the gas injection passage 22d and the non-return valve 29e, the gas refrigerant reaches the gas injection port 22c, and is injected part-way through the compression process of the compressor 22.

The liquid refrigerant inside the gas-liquid separator 25, on the other hand, flows out from a liquid refrigerant outlet 25b opening near the bottom of the gas-liquid separator 25 and is reduced in pressure by the temperature-operated expansion valve 27. The reduced-pressure liquid refrigerant then passes through the electromagnetic valve 28b and flows into the inside heat exchanger 11. Then, refrigerant inside the inside heat exchanger 11 absorbs heat from air blown by the blower 7, and evaporates. The cooled air is then blown into the passenger compartment through the face outlet 9 to accomplish passenger compartment cooling.

Gas refrigerant evaporated in the inside heat exchanger 11 is sucked through the refrigerant intake passage 22e into the intake port 22b of the compressor 22. Because the temperature of the compressor intake refrigerant is sensed by the temperature sensing tube 27a set on the refrigerant intake passage 22e and is transmitted to the temperature-operated expansion valve 27, the temperature-operated expansion valve 27 adjusts the flow of refrigerant flowing into the inside heat exchanger 11 so that the compressor intake refrigerant has a predetermined degree of superheating.

Next, when the dehumidifying operation mode is set with the temperature control lever 51, refrigerant flows along the route shown by the arrows D in FIG. 1.

That is, gas refrigerant delivered by the compressor 22 passes through the electromagnetic four-way valve 23, flows into the inside heat exchanger 12, and exchanges heat with air blown by the blower 7 so that the gas refrigerant condenses. Then, refrigerant flowing out from the inside heat exchanger 12 passes through the non-return valve 29c, is reduced in pressure by the electric expansion valve 26, and assumes an intermediate pressure gas/liquid two-phase state.

The intermediate pressure gas/liquid two-phase refrigerant flows into the inside of the gas-liquid separator 25, and gas refrigerant separated here passes from the gas refrigerant outlet 25a at the top of the gas-liquid separator 25 and through the gas injection passage 22d and the non-return valve 29e, and is sucked into the gas injection port 22c.

The liquid refrigerant inside the gas-liquid separator 25, on the other hand, passes through the open electromagnetic valve 28b and flows into the inside heat exchanger 11 after flowing out from the liquid refrigerant outlet 25b and being reduced in pressure by the temperature-operated expansion valve 27. Then, the refrigerant inside the inside heat exchanger 11 absorbs heat from air blown by the blower 7 and evaporates. Because the electromagnetic valve 28a is closed, refrigerant having left the inside heat exchanger 11 does not flow to the outside heat exchanger 24 side and is sucked into the compressor 22.

As described above, in the dehumidifying operation mode, because refrigerant flows to both the inside heat exchangers 11, 12 mounted inside the in-compartment air-conditioning unit 1, air blown from the blower 7 is first cooled and dehumidified by the inside heat exchanger 11 and then is reheated by the inside heat exchanger 12. Here, because the amount of heat released in the inside heat exchanger 12 is the sum of the amount of heat absorbed in the inside heat exchanger 11 and the amount of work done in the compressor 22, the temperature of air blown into the passenger compartment becomes higher than the temperature of the air taken in through the intake openings 3, 4 and 5. Therefore, heating and dehumidification functions can be simultaneously carried out.

Next, when the temperature control lever 51 sets the heating operation mode, refrigerant flows along the route shown by the arrows H in FIG. 1.

That is, gas refrigerant delivered by the compressor 22 passes through the electromagnetic four-way valve 23, flows into the inside heat exchanger 12, and exchanges heat with air blown by the blower 7 so that the gas refrigerant condenses. Warm air heated by heat released from the gas refrigerant is blown mainly through the foot outlet 8 into the passenger compartment to heat the inside of the compartment.

Subsequently, refrigerant leaving the inside heat exchanger 12 passes through the non-return valve 29c, is reduced in pressure by the electric expansion valve 26, and assumes an intermediate pressure gas/liquid two-phase state.

The intermediate pressure gas/liquid two-phase refrigerant flows into the inside of the gas-liquid separator 25. Gas refrigerant separated here flows through the gas refrigerant outlet 25a at the top of the gas-liquid separator 25, and then through the gas injection passage 22d and the non-return valve 29e, and is sucked into the gas injection port 22c.

The liquid refrigerant inside the gas-liquid separator 25, on the other hand, after flowing out from the liquid refrigerant outlet 25b and being reduced in pressure by the temperature-operated expansion valve 27 and passing through the non-return valve 29a, flows into the outside heat exchanger 24. Then, refrigerant inside the outside heat exchanger 24 absorbs heat from outside air blown by the outside fans 24a and evaporates.

Gas refrigerant evaporated in the outside heat exchanger 24 passes through the electromagnetic valve 28a and is sucked into the intake port 22b of the compressor 22 through the refrigerant intake passage 22e.

Next, control processing for the electric expansion valve 26 and the inverter 30 carried out by the microcomputer of the control unit 40 will be described using the flow diagram of FIG. 8.

Figure 8:
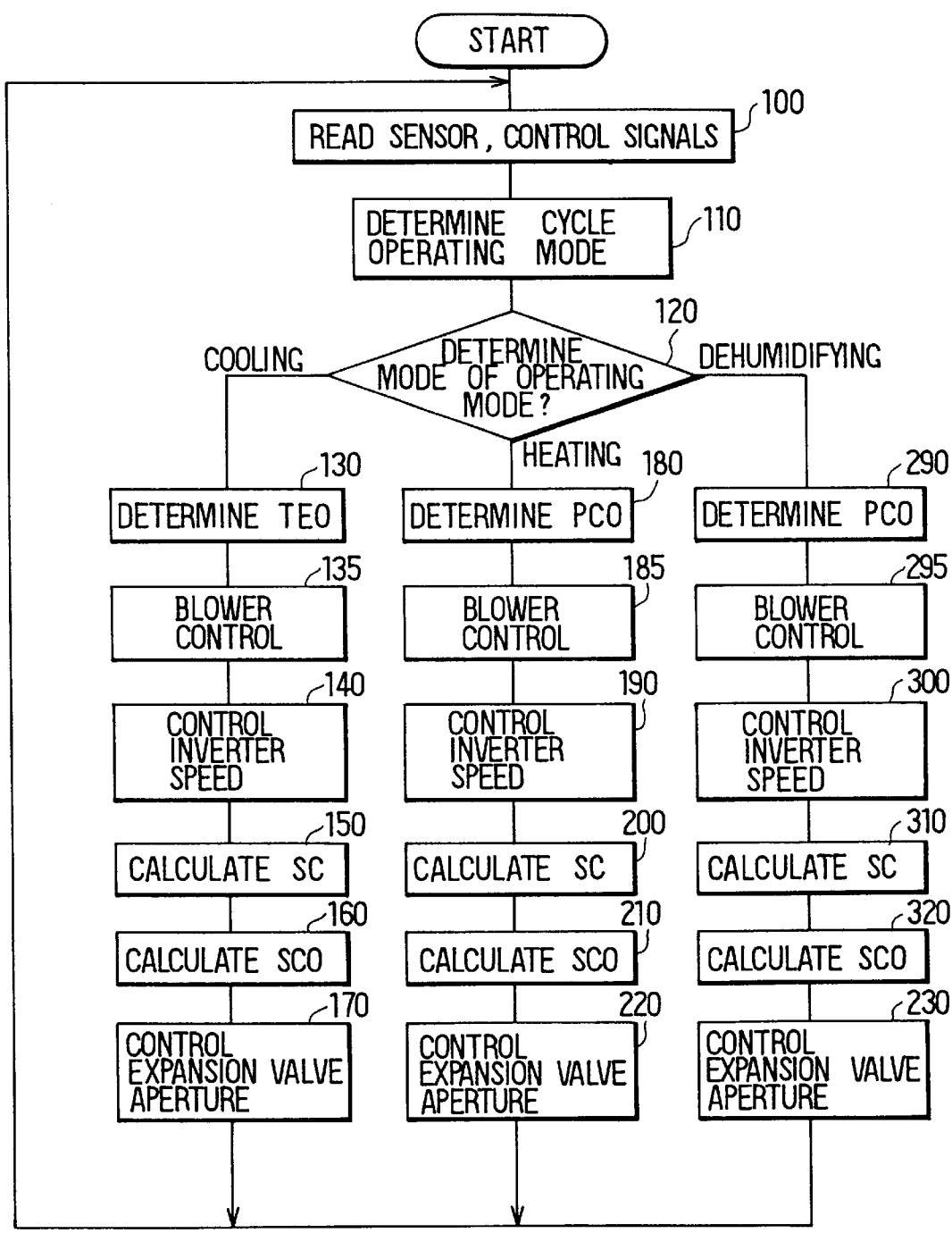
FIG. 8 is a control flow diagram of a microcomputer of the present invention.

When the key switch of the vehicle is turned on and power is supplied to the control unit 40, the routine of FIG. 8 is started. First, at step 100, signals from the sensors 41 through 48 and the control panel 50 are read. Then, at step 110, in correspondence with the set position of the temperature setting lever 51, the operating mode of the refrigerating cycle 21 is determined as shown in FIG. 7.

Then, at step 120, the mode of the operating mode determined in the above-mentioned step 110 is determined. When it is determined to be the cooling operation mode, processing of steps 130 through 170 is carried out. When it is determined to be the heating operation mode, processing of steps 180 through 220 is carried out. When it is determined to be the dehumidifying operation mode, processing of steps 290 through 330 is carried out.

First, when the mode at step 120 is determined to be the cooling mode, processing as will be described below is executed.

Figure 13:
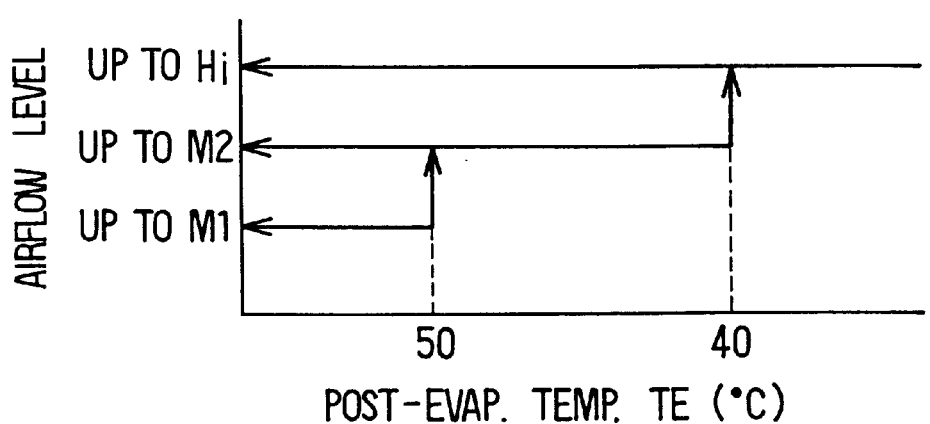
FIG. 13 is an airflow level control characteristic diagram of cooling times in the present invention.

At step 130, a target draft temperature TEO corresponding to the set position of the temperature setting lever 51 is determined by searching from a map shown in FIG. 4 stored in ROM. Then, at step 135, blower control shown in FIG. 13 is carried out, as it is necessary for the blowing of hot air to be controlled during initiation of the cooling mode under certain conditions, such as when passenger compartment temperature is high due to, for example, the vehicle having been parked in the sun on a hot summer day.

To this end, the blower 7 is started at an airflow level below a medium airflow $M_1$ when the detected temperature of the post-evaporator temperature sensor 43 is higher than a predetermined temperature (for example the 50° C. in FIG. 13), irrespective of the airflow level that a user has set by means of the airflow switching lever 52. Therefore, it is possible to prevent hot air from being blown into the passenger compartment at the start of cooling when the passenger compartment is heated to or above the predetermined temperature. Here, the blower 7 may be started at a minimum airflow level (Lo).

When the detected temperature of the post-evaporator temperature sensor 43 is lower than the above-mentioned predetermined temperature, for example, in the region between the 50° C. and the 40° C. in FIG. 13, the blower 7 is operated at an airflow level below an airflow $M_2$, one step higher than the medium airflow $M_1$. When the detected temperature of the post-evaporator temperature sensor 43 is further reduced and falls below 40° C., the blower 7 is operated at any airflow level below a maximum airflow Hi. That is, the voltage across terminals of the blower motor 7a is adjusted to produce an airflow that the user has set with the airflow switching lever 52.

At step 140, the inverter 30, and thereby the compressor speed, is controlled so that the temperature detected by the post-evaporator temperature sensor 43 (the temperature of air immediately after passing through the inside heat exchanger 11) becomes the above-mentioned TEO.

Then, at step 150, an actual degree of supercooling (SC) of the condensed liquid refrigerant in the outside heat exchanger 24 is calculated on the basis of the following Exp. 1.

$$SC = T(Ph) - Tos \qquad \text{Exp. 1}$$

Here, Tos is the detection value of the outside heat exchanger outlet refrigerant temperature sensor 45, and T(Ph) is a refrigerant condensation temperature calculated from the detection value of the high-pressure sensor 47. That is, because the detection value of the high-pressure sensor 47 is equivalent to the refrigerant condensation pressure, in the embodiment, a map (not shown) showing the correlation between the refrigerant condensation pressure and the refrigerant condensation temperature is pre-stored in ROM, and a condensation temperature corresponding to the detection value of the high-pressure sensor 47 is calculated on the basis of the map.

Figure 9:
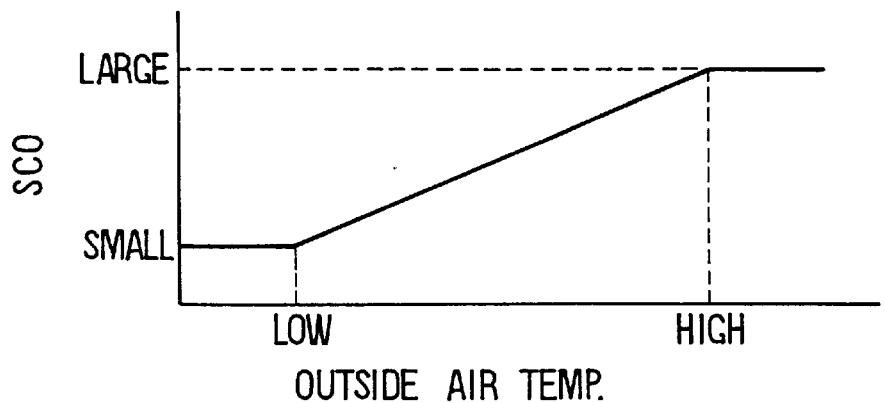
FIG. 9 is a map showing a relationship between outside air temperature and target degree of supercooling SCO in the present invention.

Then, at step 160, a target degree of supercooling (SCO) corresponding to the outside temperature detected by the outside air temperature sensor 41 is calculated by searching the map of FIG. 9 stored in ROM. By a target degree of supercooling SCO being calculated from the map of FIG. 9, it is possible to maximize the performance coefficient COP during cooling of the refrigerating cycle 21 (the above-mentioned heat-absorbing capacity Q/the power W of the compressor 22) while optimizing the heat-absorbing capacity Q in the inside heat exchanger for cooling 11.

That is, generally, in summer when the outside air temperature is high, as the outside air temperature increases, the compressor works more to secure cooling capacity for cooling the inside of the passenger compartment. Therefore, the temperature difference between the refrigerant temperature and the outside air temperature becomes large at the time when the pressure and the refrigerant temperature of the outside heat exchanger become high. That is, the heat-releasing capacity Q in the outside heat exchanger 24 becomes large.

Therefore, even if a large value of the target degree of supercooling SCO is calculated and, as a result, the power W of the compressor 22 becomes large, because the capacity Q and the cooling COP become large, when the outside air temperature is high, the target degree of supercooling SCO is calculated as a large value.

At step 170, the aperture of the electric expansion valve 26 is controlled so that the actual degree of supercooling SC calculated at step 150 becomes the target degree of supercooling SCO calculated at step 160. Specifically, first the deviation (ASC) between the above-mentioned SC and SCO is calculated. Subsequently, an increase/decrease aperture EVC of the electric expansion valve 26 corresponding to the deviation SC is calculated from a map (not shown) that is stored in ROM. Then, the present aperture of the electric expansion valve 26 is increased or decreased by the above-mentioned increased/decreased aperture ΔEVC.

Next, when the mode is determined in the above-mentioned step 120 to be the dehumidifying operation mode, subsequent processing will be described.

Figure 14:
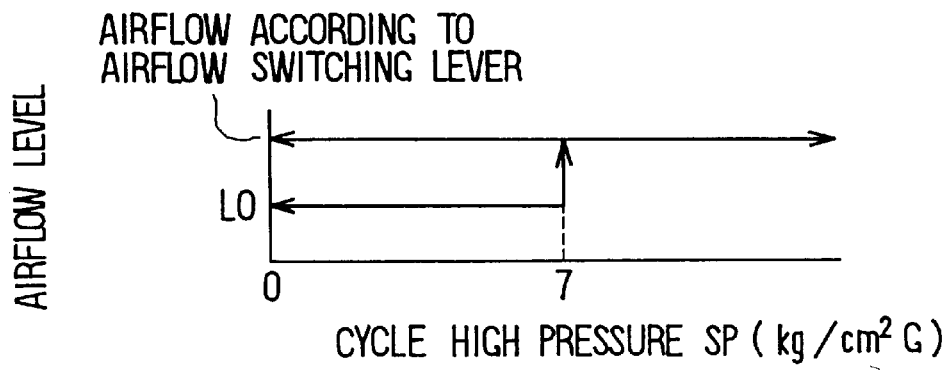
FIG. 14 is an airflow level control characteristic diagram of dehumidifying times of the present invention.

At step 290, a target high-pressure pressure PCO corresponding to the set position of the temperature setting lever 51 is determined based on a map stored in ROM (FIG. 5). Then, at step 295 blower control during dehumidification (FIG. 14) is carried out. That is, to quicken the rise of the cycle high pressure (the rise of the heat-releasing capacity of the inside heat exchanger for heating 12), the blower 7 is started at a minimum airflow level (Lo) based on the detection value of the high-pressure sensor 47, until the cycle high pressure SP rises to a predetermined value (in the example of FIG. 14, 7 $kg/cm^2G$), irrespective of the airflow level that the user has set by means of the airflow switching lever 52.

As a result, it is possible to suppress the amount of heat released by the refrigerant in the inside heat exchanger 12 and quicken the rise in the cycle high pressure. After the high pressure SP has risen to the predetermined value (7 $kg/cm^2G$), the voltage across terminals of the blower motor 7a is adjusted to produce the airflow level set by the user by means of the airflow switching lever 52. The control brings the airflow level to a minimum level (Lo) only for a predetermined time (for example 3 minutes) after the compressor 22 starts. After the predetermined time after startup elapses, irrespective of the high pressure SP, the airflow level is switched to that set by the user.

At step 300, the inverter 30 and compressor speed is controlled so that the high pressure detected by the high-pressure sensor 47 becomes the above-mentioned PCO.

Then, at step 310, the degree of supercooling SC of the condensed liquid refrigerant in the inside heat exchanger for heating 12 is calculated on the basis of the following Exp. 2.

$$SC = T(Ph) - Tcs \qquad \text{Exp. 2}$$

Here, Tcs is the detection value of the inside heat exchanger outlet refrigerant temperature sensor 44.

Figure 10:
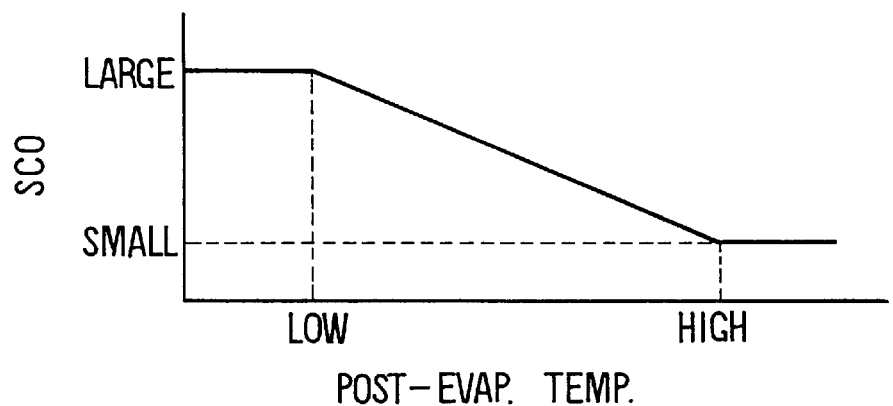
FIG. 10 is a map showing a relationship between post-evaporator temperature and target degree of supercooling SCO in the present invention.

Then, at step 320, a target degree of supercooling SCO corresponding to the post-evaporator temperature detected by the post-evaporator temperature sensor 43 is calculated based on the map of FIG. 10 stored in ROM. By a target degree of supercooling SCO being calculated from the map of FIG. 10, while optimizing the heat-releasing capacity Q in the inside heat exchanger for heating 12, it is possible to maximize the performance coefficient COP during dehumidification of the refrigerating cycle 21 (the above-mentioned heat-releasing capacity Q/the power W of the compressor 22).

That is, the post-evaporator temperature detected by the post-evaporator temperature sensor 43 is equivalent to the temperature of air flowing into the inside heat exchanger 12. Therefore, because the above-mentioned high post-evaporator temperature means that the temperature difference between the refrigerant temperature inside the inside heat exchanger 12 and the temperature of air flowing into the inside heat exchanger 12 is large, the above-mentioned heat-releasing capacity Q is therefore large.

Accordingly, the target degree of supercooling SCO is calculated as a large value, even if a large value of the target degree of supercooling SCO is calculated and, as a result, the power W of the compressor 22 becomes large, because the capacity Q and the dehumidification COP become large when the post-evaporator temperature is low.

At step 330, the aperture of the electric expansion valve 26 is controlled so that the degree of supercooling SC calculated at step 310 becomes the target degree of supercooling SCO calculated at step 320. Because the specific control method of step 330 is the same as in step 170, a description thereof will be omitted.

Next, when at step 120 the mode is determined to be the heating mode, subsequent processing will be described.

Figure 15:
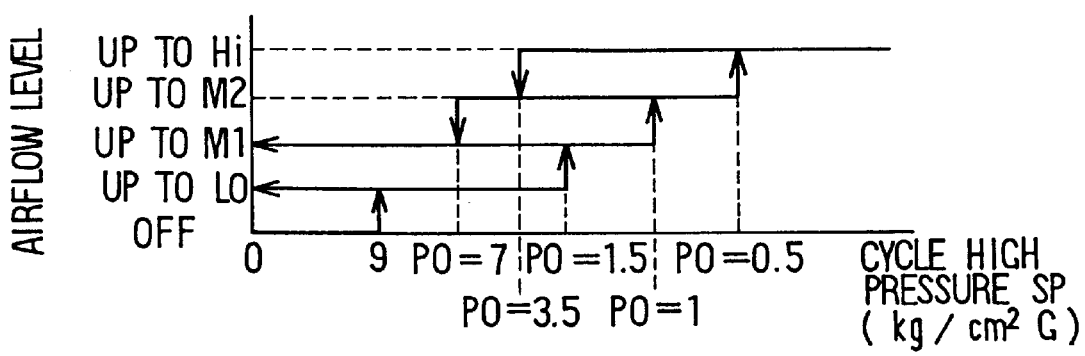
FIG. 15 is an airflow level control characteristic diagram of heating times in the present invention.

At step 180, a target high pressure PCO corresponding to the set position of the temperature setting lever 51 is determined on the basis of the map shown in FIG. 6, which is pre-stored in ROM. Then, at step 185, blower control during heating shown in FIG. 15 is carried out. That is, to prevent cold air from being blown from the foot outlet 8, and to quicken the rise of the cycle high pressure, the blower 7 is maintained in a stopped state on the basis of the detection value of the high-pressure sensor 47, until the cycle high pressure SP rises to a predetermined value (in the example of FIG. 15, 9 kg/cm$^2$G), irrespective of the airflow level that the user has set with the airflow switching lever 52.

As a result, it is possible to suppress the amount of heat released by refrigerant in the inside heat exchanger for heating 12 and to quicken the rise of the cycle high pressure SP. Then, after the cycle high pressure SP has risen to the predetermined value (9 kg/cm$^2$G), to improve heating, the airflow is increased one stage at a time to the airflow level that the user has set with the airflow switching lever 52. During this stepwise increase, when the deviation PO (PO=PCO−SP) between the actual high pressure SP of the cycle and the target high-pressure PCO falls to a predetermined value (of which an example is shown in FIG. 15), the voltage across terminals of the blower motor 7a is adjusted so that the airflow level increases to the next higher stage.

The above startup airflow control is only for a predetermined time (for example 3 minutes) after the startup of the compressor 22. After the predetermined time elapses, in correspondence with falling of the above-mentioned deviation PO, the airflow level is successively increased in the above-described stepwise manner to the user-set airflow level.

At step 190, the inverter 30, and thereby the compressor speed, is controlled so that the high pressure SP detected by the high-pressure sensor 47 becomes the above-mentioned PCO.

Then, at step 200, the degree of supercooling SC of the condensed liquid refrigerant in the inside heat exchanger 12 is calculated on the basis of the above-mentioned Exp. 2.

Figure 11:
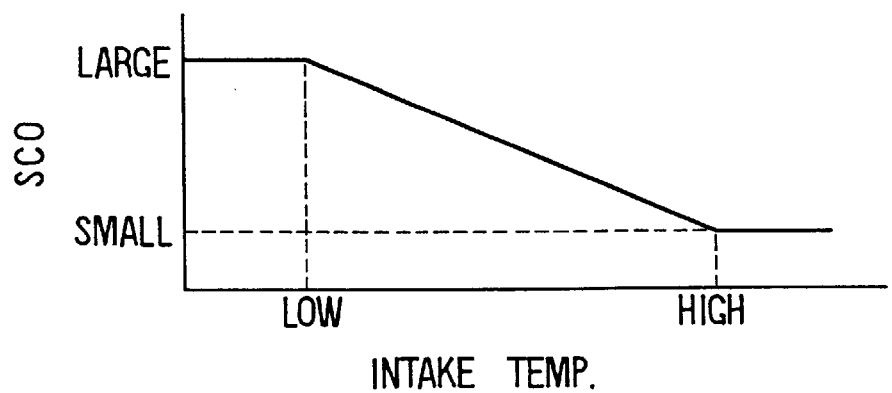
FIG. 11 is a map showing a relationship between intake temperature and target degree of supercooling SCO in the present invention.

Subsequently, at step 210, a target degree of supercooling SCO corresponding to the intake temperature that the intake temperature sensor 42 has detected is calculated from the map of FIG. 11. By calculating a target degree of supercooling SCO from this map, the heating COP of the refrigerating cycle 21 (above-mentioned heat-releasing capacity Q/power W of compressor 22) can be maximized while optimizing the heat-releasing capacity Q in the inside heat exchanger for heating 12.

That is, in the heating operation mode, because refrigerant does not flow inside the inside heat exchanger 11, the temperature that the intake temperature sensor 42 detects (the intake side air temperature of the inside heat exchanger for cooling 11) is equivalent to the temperature of air passing through the inside heat exchanger 12. Therefore, a low intake temperature means that the temperature difference between the refrigerant temperature inside the inside heat exchanger 12 and the temperature of air passing through the inside heat exchanger 12 is large. Thus, the above-mentioned heat-releasing capacity Q is large.

Therefore, even if a large value of the target degree of supercooling SCO is calculated and, as a result, the power W of the compressor 22 becomes large, because the capacity Q and the heating COP become large, when the post-evaporator temperature is low, the target degree of supercooling SCO is calculated as a large value.

Then, at step 220, the aperture of the electric expansion valve 26 is controlled so that the degree of supercooling SC calculated at step 200 becomes the target degree of supercooling SCO calculated at step 210.

By the control of the above-mentioned steps 180 through 220, basically, the heating capacity is controlled by the compressor speed, and the aperture of the electric expansion valve 26 is controlled so that the efficiency (COP) of the refrigerating cycle 21 is maximized.

However, at times of heating capacity deficiency such as, for example, in the initial stage of rapid heating of the passenger compartment interior, while the compressor speed is at a maximum, the high pressure has not reached the above-mentioned target high pressure PCO, priority must be given to increasing the heating capacity, even if the efficiency of the refrigerating cycle 21 must be decreased.

Figure 12:
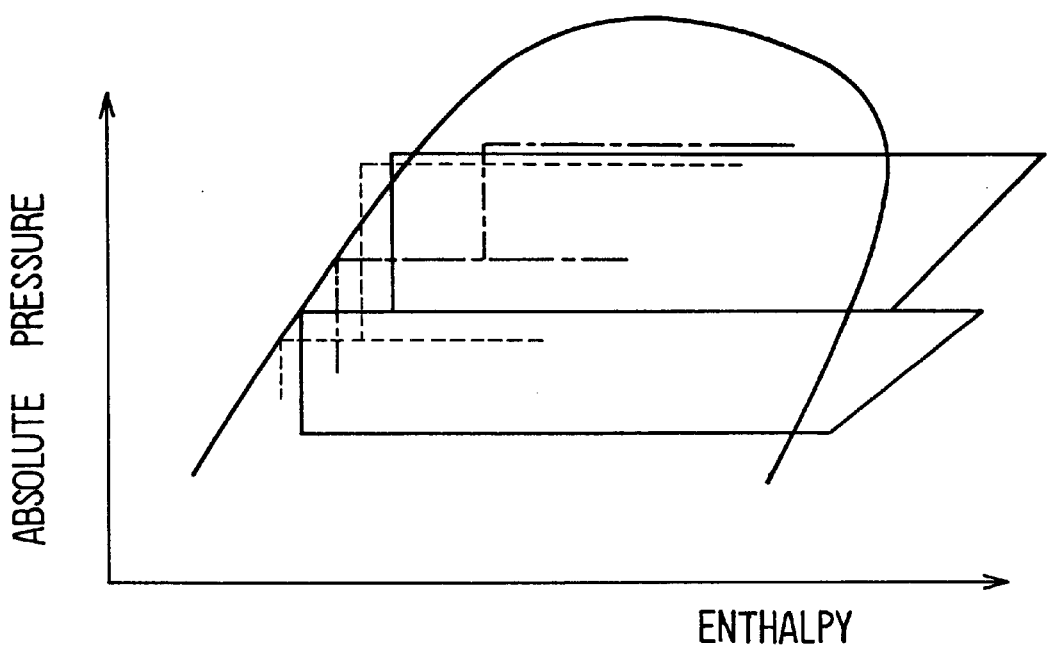
FIG. 12 is a Mollier diagram of the refrigerating cycle 21 of the present invention.

Therefore, when there is a heating capacity deficiency while the compressor speed is at a maximum, the aperture of the electric expansion valve 26 is increased to increase the heating capacity. Referring to the Mollier diagram shown in FIG. 12, when the refrigerating cycle 21 is stable at the state shown by the solid lines in FIG. 12 and the electric expansion valve 26 is opened by a predetermined amount, the refrigerating cycle 21 stabilizes in the state shown with by the single dot chain lines of FIG. 12 (a state wherein the intermediate pressure has risen).

Because as a result of the rise in the intermediate pressure the compressor gas injection amount increases, the compressor 22 does compression work with the above-mentioned amount of gas-injected refrigerant added to the amount of refrigerant circulation taken in through the intake port 22b. As a result, although the amount of work of the compressor 22 increases and the efficiency of the refrigerating cycle 21 falls, because the amount of heat released by refrigerant in the inside heat exchanger for heating 12 increases, the heating capacity can be increased.

However, because the gas injection amount and the compressor load increases, and the load of the inverter 30 becomes larger as the electric expansion valve 26 is opened, it is necessary to detect the current of the inverter 30 and perform electric expansion valve control for overload prevention of the inverter 30.

Thus, the specific expansion valve control of during heating carried out at step 220 is control peculiar to heating operation, and differs from step 170 (control for cooling) and step 330 (control for dehumidifying). Hereinafter, expansion valve control during heating will be described specifically, on the basis of the flow diagram of FIG. 16.

Figure 16:
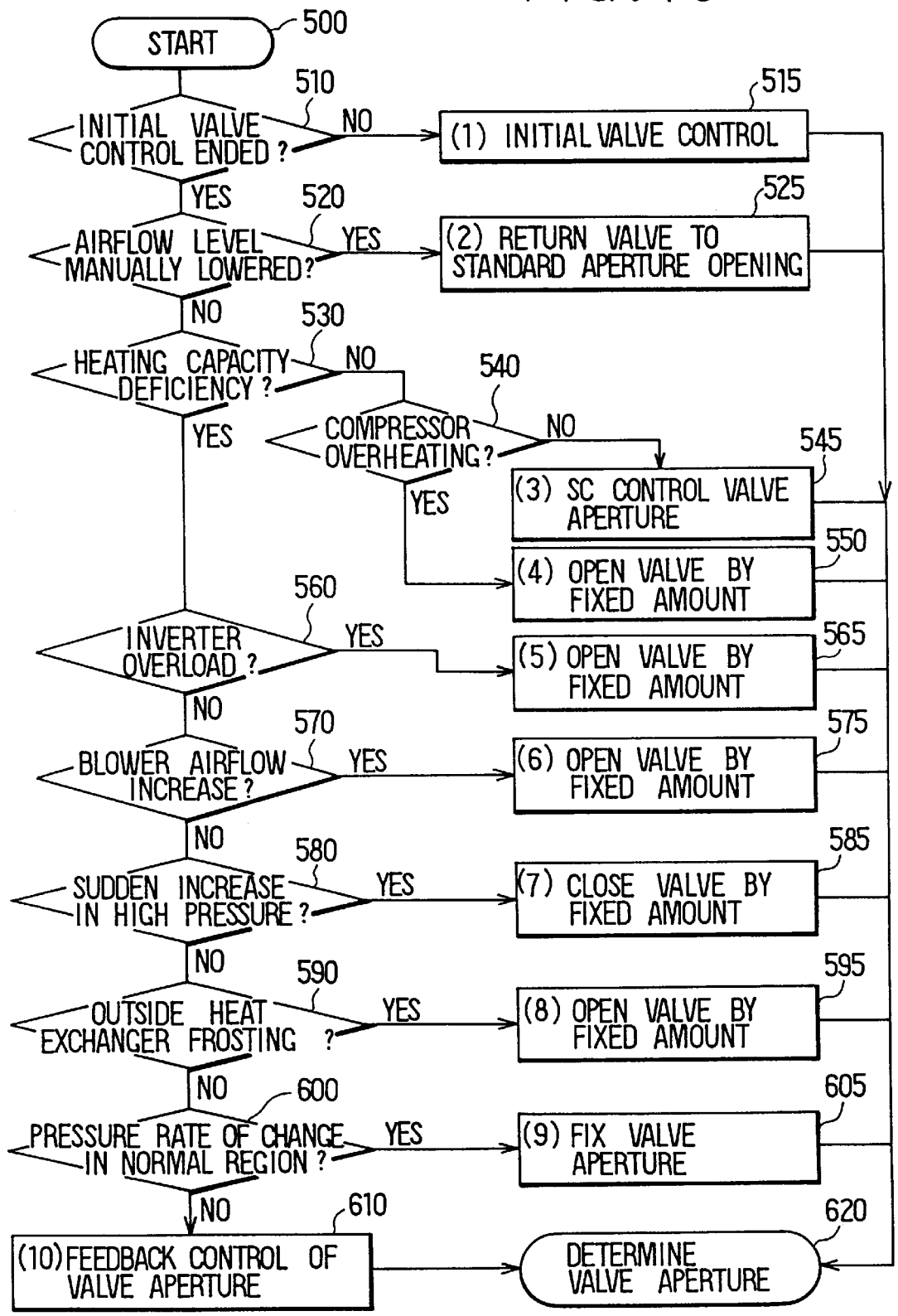
FIG. 16 is a flow diagram of expansion valve aperture control of heating times in the present invention.

In FIG. 16, at step 500 expansion valve control starts. First, at step 510, it is determined whether initial control of the electric expansion valve 26 has ended. That is, the electric expansion valve aperture is fixed for a fixed time at a standard aperture when the cycle is in an unstable state, such as during refrigerating cycle startup and at times of operation mode switching, because when the aperture of the electric expansion valve 26 is feedback controlled the cycle becomes still more unstable. The control fixing the electric expansion valve aperture at a standard angle will be referred to as initial control.

Accordingly, initial control ending is inferred after a fixed time has elapsed with the electric expansion valve 26 at the standard aperture. The standard aperture EVS is calculated by the following Exp. 3.

$$EVS = (EVS' + EVA) * Kevs \qquad \text{Exp. 3}$$

EVS' is calculated from the map shown in FIG. 17 in correspondence with the outside air temperature Tam and the in-compartment temperature (in the proposal, substituted for with the post-evaporator temperature sensor).

The vertical axis of FIG. 17 represents the aperture of the electric expansion valve 26, and the electric expansion valve 26 in the example has a step motor as an actuator, with the aperture being adjustable by pulses applied to the step motor.

EVA is a coefficient set to amend the standard aperture when overload control (step 565 discussed later) comes in during electric expansion valve 26 control.

Kevs is a correction coefficient based on the airflow level set by the user, and as shown in FIG. 18 is set so that the coefficient decreases as the airflow level decreases so that the standard aperture EVS becomes smaller.

When at step 510 the answer is determined to be NO, processing moves to step 515, and the above-mentioned initial control is carried out.

Next, when the above-mentioned initial control ends and the determination in step 510 becomes YES, processing moves to step 520, and it is determined whether the user has lowered the airflow level by means of the airflow switching lever 52.

When the airflow level has been lowered by a manual operation of the airflow switching lever 52, processing moves to step 525, and the electric expansion valve 26 is returned to the standard aperture EVS explained at step 510. The step is carried out to prevent draft temperature fluctuations caused by the airflow falling, by the high pressure rising abnormally, and by cycle stoppages caused by increases in inverter current.

On the other hand, when at step 520 the determination is NO, processing moves to step 530 and heating capacity deficiency is determined. The heating capacity deficiency determination is carried out based on the deviation PO (PCO-SP) between the high pressure SP detected by the high-pressure sensor 47 and the target high-pressure pressure PCO. That is, the horizontal axis of FIG. 19 represents the deviation PO. In the figure to the left of the horizontal axis, the deviation PO is large, and to the right of the horizontal axis the deviation PO is small.

In FIG. 19, the state A wherein the deviation PO becomes large is a state of heating capacity deficiency, and the state B wherein the deviation PO becomes small is a state such that the heating capacity is sufficient. However, because at times of switching of the airflow level (for example, times of airflow level reduction from Hi M2) the high pressure SP transiently rises even at times of capacity deficiency, for the determination of heating capacity deficiency it is preferable to use both the deviation PO and the compressor speed.

Accordingly, at step 530, when it is the B state wherein the deviation PO is small, and also when the compressor speed is not in a high-speed region (the compressor speed is less than a predetermined speed), it is inferred that the heating capacity is sufficient. Processing subsequently moves to step 540, and it is determined whether the compressor is overheating. Overheating is determined when the detection value of the compressor temperature (delivery refrigerant temperature) sensor 46 increases above a fixed temperature. When processing moves to step 550, the aperture of the electric expansion valve 26 is opened by a predetermined amount, and the compressor delivery temperature is lowered by an increase in the gas injection amount. When at step 540 it is determined that the compressor temperature is normal (NO), processing moves to step 545, and the aperture of the electric expansion valve 26 is controlled so that the efficiency of the cycle reaches a maximum value. Because the aperture control of the electric expansion valve 26 at step 545 is the same as that during dehumidification and cooling as discussed above, (Japanese Unexamined Patent Publication No. Hei. 9-86149), a specific description will be omitted.

On the other hand, when at step 530 the A state of FIG. 19 exists, wherein the deviation PO is large, or the compressor speed is above a predetermined value, a heating capacity deficiency is determined to exist (YES), processing moves to step 560, and a determination of inverter overloading is carried out. This determination is determined as shown in FIG. 20 based on the detection value of the inverter current detected by the current sensor 48.

That is, when the inverter current exceeds a first determination current value g, it is determined to be an overload L. Processing then moves to step 565, the aperture of the electric expansion valve 26 is closed by a fixed degree, and the compressor torque is reduced by a reduction in the gas injection amount. As a result, the inverter current value is reduced.

If, for some reason, the inverter current exceeds a second determination current value h (FIG. 20), it is determined to be an overload H. Subsequently, at step 565 the compressor speed is lowered. Further, when the inverter current exceeds a third determination current value i, it is determined to be a stopping region of the cycle and at step 565 the compressor 22 is stopped. By the kind of control being carried out at step 565, overloading of the inverter 30 is prevented.

Figure 20:
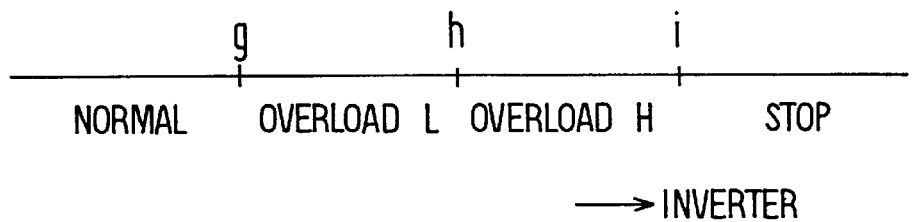
FIG. 20 is an explanatory view of inverter overload prevention control in the present invention.

Next, when the inverter current is smaller than the first determination current value g of FIG. 20, at step 560 it is determined to be normal (NO), processing moves to step 570, and a determination of whether the airflow of the blower 7 has increased is carried out. Here, when the airflow has risen, to prevent a fall of the high pressure, processing moves to step 575, and the aperture of the electric expansion valve 26 is opened by a fixed degree.

On the other hand, when there is no change in the airflow, the determination of step 570 is NO, and processing moves to step 580, where a determination of sudden increase of the high pressure is performed. This determination is to prevent cycle stoppage caused by control-lowered compressor speed, or by overloading under conditions such that the high pressure of the cycle is liable to rise, such as when the airflow is low and when the in-compartment temperature is high if the aperture of the electric expansion valve 26 is too large, the high pressure rises suddenly, and the inverter output current exceeds a rated value (the second determination current value h of FIG. 20).

As a specific method for implementing the above determination, for example, a pressure change rate ΔSP<−60> is calculated using the following Exp. 4 from a minimum value SP<−60> of the high pressure over a predetermined elapsed time (for example 1 minute) and the present high pressure value detected by the pressure sensor 47.

$$\Delta SP<-60> = SP - SP<-60> \qquad \text{Exp. 4}$$

Figure 21:
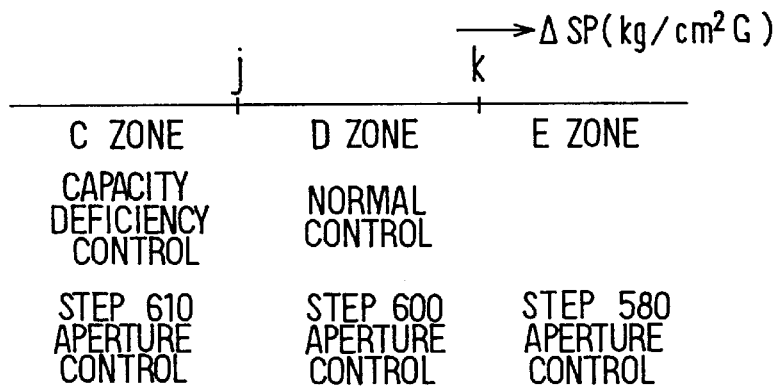
FIG. 21 is an explanatory view of expansion valve aperture control based on pressure change rate in the present invention.

Then, when the pressure change rate ΔSP<−60> is above a fixed value, or specifically, in FIG. 21, when the pressure change rate has risen above a second determination current value k (second determination current value k>first determination current value j), it is regarded as an abnormal high pressure rise, and processing moves to step 585, wherein the aperture of the electric expansion valve 26 is immediately closed by a fixed amount.

On the other hand, when at step 580 the pressure change rate ΔSP<−60> is smaller than the above-mentioned second determination current value k, it is determined that there is no sudden rise of the high pressure, and processing moves to step 590, where a determination of frosting of the outside heat exchanger 24 is carried out. When heating operation is performed in a high humidity low outside air temperature environment, the heating performance falls due to frost formation on the outside heat exchanger 24.

It is determined from the detection value of the outside heat exchanger outlet refrigerant temperature sensor 45 set at the exit of the outside heat exchanger 24 whether or not there is frosting in the outside heat exchanger 24. For example, when the outside heat exchanger outlet refrigerant temperature falls below a fixed temperature, it is determined that there is frosting, and at step 595 the aperture of the electric expansion valve 26 is opened by a fixed amount to increase the heating performance.

On the other hand, when at step 590 it is determined that there is no frosting, processing moves to step 600, and it is determined whether the pressure change rate is in a normal control region. Here, when the above-mentioned pressure change rate ΔSP<−60> is positioned between the first determination current value j and the second determination current value k of FIG. 21, it is determined that a normal control region exists. Further, the aperture of the electric expansion valve 26 is fixed, so the cycle high pressure is made to rise in a stable manner and the sudden pressure increase described in the above-mentioned step 580 is suppressed.

Figure 22:
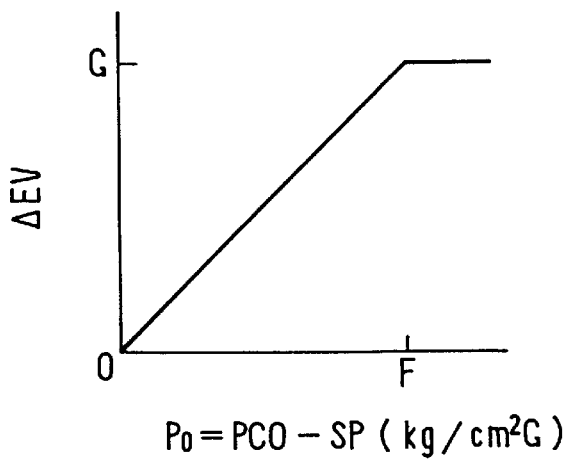
FIG. 22 is a control map of expansion valve aperture increase ΔEV of the present invention.

At step 600, when it is determined that the above-mentioned pressure change rate ΔSP<−60> is less than the first determination current value j of FIG. 21, finally, processing moves to step 610, and the feedback control of expansion valve aperture with respect to heating capacity deficiency that is the final object of the control is performed. Here, a valve aperture increase ΔEV of the electric expansion valve 26 is obtained by means of the control map of FIG. 22 (stored in microcomputer ROM) from the deviation PO between the target high pressure PCO and the actual high pressure SP. As shown in FIG. 22, with rising of the deviation PO the valve aperture increase ΔEV increases proportionally, and after the deviation PO rises to a predetermined value F the valve aperture increase ΔEV saturates at a maximum value G.

According to the flow diagram of FIG. 16, at step 620, the expansion valve aperture is determined at one of the apertures shown by (1) through (10) in the figure, and the electric expansion valve 26 is driven at the aperture.

Figure 23A:
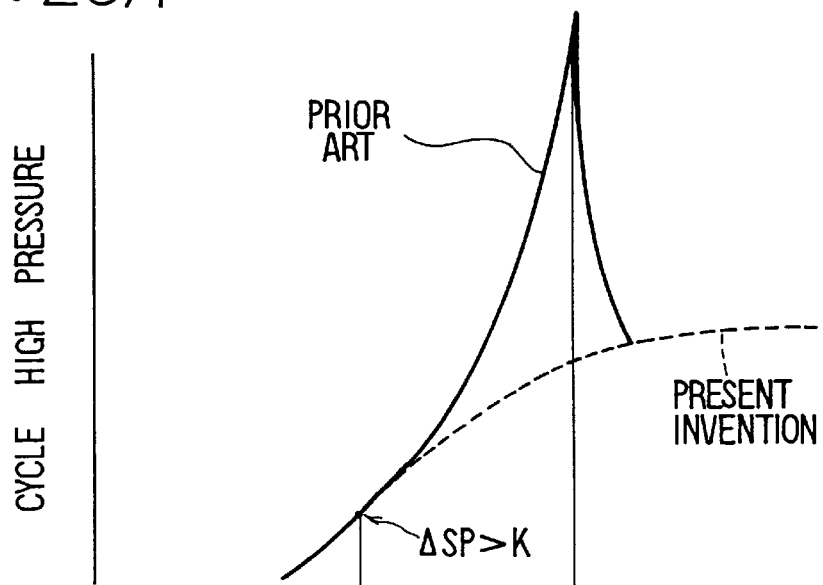
FIGS. 23A–23B are operation explanatory views of times of rapid high pressure rise in the present invention and in a conventional air conditioner control apparatus.
Figure 23B:
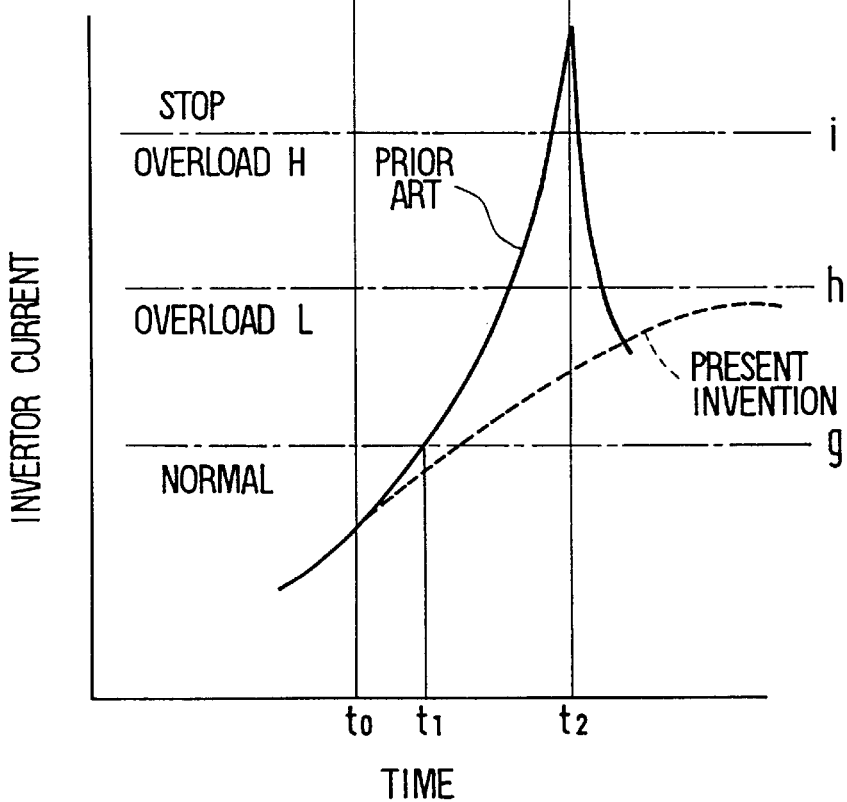

Incidentally, FIGS. 23A–23B show behavior of the inverter current and the cycle high pressure under conditions such that the high pressure of the cycle is liable to rise suddenly, such as when the delivery airflow to the passenger compartment interior is low and when the in-compartment temperature is high at times of heating. The solid lines in FIGS. 23A–23B show a case wherein expansion valve aperture control according to the prior art is carried out, while the broken lines in FIGS. 23A–23B show a case wherein expansion valve aperture control according to the present embodiment described above is carried out.

With the present embodiment, as described above, because the change rate of the cycle high pressure within a predetermined past time, namely the pressure change rate ΔSP, is calculated, and the expansion valve aperture control shown in FIG. 21 is carried out, a state wherein the pressure change rate ΔSP is larger than the second determination current value k of FIG. 21 arises at a time of sudden rise in the high pressure, in the normal zone of FIG. 23A (the region of inverter current<first determination current value g). Subsequently, control of the expansion valve aperture to the closed side is initiated.

That is, expansion valve closing control can be started at a time prior to the starting time $t_1$ of expansion valve closing control according to the prior art. As a result, a rise in the cycle high pressure can be initially suppressed. In addition, the cycle high pressure rise peak, as is shown by the broken lines of FIG. 23A, can be greatly lowered compared to the prior art. In addition, the inverter current rise peak, as is shown with broken lines in FIG. 23A, can be lowered substantially compared to the prior art, and can be kept within the second determination current value range h. As a result, the control routine, which lowers the compressor speed or stops the compressor due to a sudden rise of the inverter current can be prevented.

(Other Embodiments)

In the embodiment described above, the cycle high pressure is detected by the high-pressure sensor 47, and valve aperture control of the electric expansion valve 26 is carried out. However, because as shown in the above-mentioned FIGS. 23A and 23B there is a correlation between change in the cycle high pressure and change in inverter current, instead of the cycle high pressure, the pressure change rate ΔSP may be calculated (estimated) using the inverter current value. In short, the pressure change rate ΔSP should be calculated (estimated) using information (a physical quantity) connected to the cycle high pressure.

Also, in the embodiment described above, heating capacity deficiency was determined on the basis of the high-pressure pressure. Alternatively, it may be determined based on air temperature immediately after the air passes through the inside heat exchanger for heating 12. In short, the deficiency should be determined on the basis of information related to the heating capacity in the inside heat exchanger 12.

Also, although in the embodiment described above an inside heat exchanger 11 and an inside heat exchanger 12 were each provided independently was described, the present invention can of course also be applied to an apparatus having a cycle construction wherein one inside heat exchanger performs the functions of both an inside heat exchanger for cooling and an inside heat exchanger for heating.

Further, the above-described preferred embodiment of the present invention may be modified without departing from the proper scope or fair meaning of the accompanying claims. Other advantages of the present invention will become apparent to those skilled in the art in view of the foregoing text and drawings taken in conjunction with the following claims.

What is claimed is:

1. An air conditioning system, comprising:
   a blower for creating an air current;
   an air-conditioning duct that guides air produced by the blower into a compartment;
   a compressor having an intake port for taking in low-pressure refrigerant of a refrigerating cycle, a gas injection port for introducing intermediate pressure gas refrigerant of the refrigerating cycle, and a delivery port (22*a*) for delivering compressed high-pressure refrigerant;

an inside heat exchanger mounted inside the air-conditioning duct for condensing high-pressure refrigerant from the delivery port of the compressor during heating;

first pressure-reducing means for pressure-reducing high-pressure refrigerant from the inside heat exchanger to an intermediate pressure via an electrically-adjustable aperture;

a gas-liquid separator for gas-liquid separating intermediate pressure refrigerant from the first pressure-reducing means;

second pressure-reducing means for pressure-reducing intermediate pressure liquid refrigerant separated in the gas-liquid separator to a low pressure;

an outside heat exchanger for evaporating low-pressure refrigerant from the second pressure-reducing means during heating;

a gas injection passage for guiding intermediate pressure gas refrigerant separated in the gas-liquid separator to the gas injection port of the compressor;

compressor speed controlling means for controlling an operating speed of the compressor; and controlling means for controlling the aperture of the first pressure-reducing means, for calculating, during heating, a pressure change rate based on information relating to high pressure of the refrigerating cycle, and for reducing the aperture of the first pressure-reducing means when the pressure change rate rises above a first predetermined value.

2. The system of claim 1 wherein the controlling means fixes the aperture of the first pressure-reducing means when the pressure change rate is between the first predetermined value and a smaller second predetermined value.

3. The system of claim 2, wherein the controlling means feedback-controls the aperture of the first pressure-reducing means so that heating capacity of the inside heat exchanger becomes a predetermined capacity when the pressure change rate is less than the second redetermined value, based on information relating to the eating capacity in the inside heat exchanger.

4. The system of claim 3, wherein the controlling means calculates a deviation between a target high-pressure pressure calculated in correspondence with a user-set temperature and a high pressure of the refrigerating cycle, and increases the aperture of the first pressure-reducing means in correspondence with an increase of the deviation using the deviation as information relating to the heating capacity of the inside heat exchanger.

5. The system of claim 1 further comprising compressor load detecting means for detecting a load of the compressor, the aperture of the first pressure-reducing means being reduced when the compressor load detecting means detects that the load exceeds a first predetermined value.

6. The system of claim 5, wherein the compressor decreases in speed when the load exceeds a second predetermined value larger than the first predetermined value.

7. The system of claim 6 wherein the compressor stops when the load exceeds a third predetermined value larger than the second predetermined value.

8. The system of claim 7 wherein the compressor is an electric compressor driven by an electric motor, an inverter for adjusting the speed of the electric compressor, and a current sensor for detecting the current of the inverter, the compressor load detecting means comprising the current sensor.

9. A control apparatus for a motor vehicle air conditioner including an inside heat exchanger operative during a heating mode, a pressure adjustment device to adjust a pressure level of refrigerant passing therethrough, and a compressor having an operating speed dependent on operation of the adjustment device, the apparatus comprising:

a control input that receives sensed mode and operating signals;

a control unit that is operative to determine an air conditioner pressure change rate based on the sensed mode and operating signals, and to generate control signals to cause the pressure adjustment device to inhibit an increase in the refrigerant pressure level for a predetermined time period when the pressure change rate is greater than a predetermined value; and a control output through which the generated control signals are output to the pressure adjustment device to maintain an operating speed of the compressor when the pressure change rate is greater than a predetermined value.

10. The apparatus of claim 9 wherein the controller fixes the pressure adjustment device when the pressure change rate is between the first predetermined value and a smaller second predetermined value.

11. The apparatus of claim 10, wherein the controller controls the pressure reduction device via a feedback loop to adjust the heating capacity of the inside heat exchanger to a predetermined value when the pressure change rate is less than the second predetermined value, based on the sensed operating signals.

12. The apparatus of claim 11, wherein the controller calculates a deviation between a target pressure corresponding to a user-set temperature and a high pressure of the air conditioning circuit and adjusts the pressure reduction device using the deviation as information relating to the heating capacity in an inside heat exchanger.

13. A method of controlling refrigerant pressure in a vehicle air conditioning system during a heating mode, comprising the steps of:

determining if a heating capacity deficiency exists based on a calculated heating deficiency value;

detecting if a sudden increase in refrigerant pressure occurs, when a heating capacity deficiency exists, based on a pressure rate of change; and causing refrigerant pressure to increase in a manner that ensures uninterrupted compressor operation, if a sudden increase is detected.

14. The method of claim 13, wherein the pressure rate of change is determined based on a minimum value of the refrigerant pressure during a predetermined past time period, and a presently detected pressure value.

15. The method of claim 13, wherein the step of causing comprises controlling a system expansion valve to initially suppress an increase in refrigerant pressure to reduce a pressure peak value associated with the increase in refrigerant pressure.

* * * * *